United States Patent [19]

Harada et al.

[11] Patent Number: 4,725,531
[45] Date of Patent: Feb. 16, 1988

[54] COLOR PHOTOGRAPHIC LIGHT-SENSITIVE MATERIAL

[75] Inventors: Tōru Harada; Masaharu Toriuchi, both of Kanagawa, Japan

[73] Assignee: Fuji Photo Film Co., Ltd., Kanagawa, Japan

[21] Appl. No.: 858,777

[22] Filed: May 2, 1986

[30] Foreign Application Priority Data

May 2, 1985 [JP] Japan .................................. 60-95240

[51] Int. Cl.$^4$ .......................... G03C 1/40; G03C 5/54; G03C 7/26
[52] U.S. Cl. ................................... 430/562; 430/223; 430/225; 430/226
[58] Field of Search ............... 430/223, 225, 562, 222, 430/226

[56] References Cited

U.S. PATENT DOCUMENTS

| | | | |
|---|---|---|---|
| 3,309,199 | 3/1967 | Ross | 430/225 |
| 3,793,028 | 2/1974 | Sano et al. | 430/225 |
| 4,013,633 | 3/1977 | Haase et al. | 430/223 |
| 4,245,028 | 1/1981 | Fujita et al. | 430/223 |
| 4,528,258 | 7/1985 | Kitaguchi et al. | 430/223 |

FOREIGN PATENT DOCUMENTS 1534927 12/1978 United Kingdom .
2017132 2/1979 United Kingdom .

Primary Examiner—Richard L. Schilling
Attorney, Agent, or Firm—Sughrue, Mion, Zinn, Macpeak, and Seas

[57] ABSTRACT

A photographic light-sensitive material comprising a support having thereon at least one light-sensitive silver halide emulsion layer having associated therewith a compound represented by formula (I)

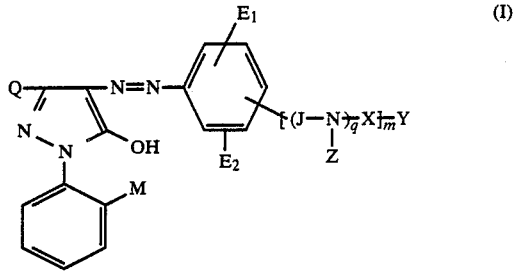

wherein Q represents a cyano group, a trifluoromethyl group, or a carbamoyl group represented by the formula —CONR$^1$R$^2$ (wherein R$^1$ represents a hydrogen atom, an alkyl group, or a substituted alkyl group, and R$^2$ represents a hydrogen atom, an alkyl group, a substituted alkyl group, an aralkyl group, or an aryl group, or R$^1$ and R$^2$ may combine directly or through an oxygen atom to form a ring); M represents an alkyl group, a substituted alkyl group, an alkoxy group, a substituted alkoxy group, or a halogen atom; E$^1$ represents a hydrogen atom, a halogen atom, an alkyl group, a substituted alkyl group, a hydroxyl group, an alkoxy group, or a substituted alkoxy group (provided that the substituted alkoxy group is not present at the para-position with respect to the azo group); E$^2$ represents a substituent defined for E$^1$ or an electron attractive group selected from a cyano group, a trifluoromethyl group, a group represented by the formula —SO$_2$R$^4$ (wherein R$^4$ represents an alkyl group, a substituted alkyl group, a phenyl group, or a substituted phenyl group), a group represented by the formula —COOR$^3$ represents a hydrogen atom, an alkyl group, a substituted alkyl group, a phenyl group, or a substituted phenyl group), a group represented by the formula —CONR$^1$R$^2$ (wherein R$^1$ and R$^2$ are each defined above), a sulfo group and a group represented by the formula —SO$_2$NR$^1$R$^2$ (wherein R$^1$ and R$^2$ are each the same as defined above); m and q each represents 0 or 1; J represents a divalent group selected from a sulfonyl group and a carbonyl group; Z represents a hydrogen atom, an alkyl group, or a substituted alkyl group; X represents a divalent bonding group represented by the formula —A$_1$—(L)$_n$—(A$_2$)$_p$— (wherein A$_1$ and A$_2$ each represents a substituted or unsubstituted alkylene group or a substituted or unsubstituted arylene group, L represents a divalent group selected from an oxy group, a carbonyl group, a carboxyamido group, a carbomoyl group, a sulfonamido group, a sulfamoyl group, a sulfinyl group, and a sulfonyl group, and n and p each represents 0 or 1); and Y represents a moiety which provides, as a result of development processing, an azo dye compound having a different diffusibility from that of the azo dye image-forming compound of formula (I).

29 Claims, No Drawings

COLOR PHOTOGRAPHIC LIGHT-SENSITIVE MATERIAL

FIELD OF THE INVENTION

The present invention relates to a color photographic light-sensitive material, and more particularly to a silver halide photographic material for a color diffusion transfer process or a heat development process which contains a novel yellow dye image-forming compound.

BACKGROUND OF THE INVENTION

In a color diffusion transfer process, a color image is formed by utilizing a difference in diffusibility between a dye image-forming compound and a dye compound (which forms a color image in an image-receiving layer) derived from the dye image-forming compound. Typical examples of the dye image-forming compounds include dye developers, dye-releasing couplers (DDR couplers), and dye-releasing redox compounds (DRR compounds) as described, for example, in *Photographic Science and Engineering*, Vol. 20, No. 4, pages 155 to 164 (July/August, 1976) and T. H. James, *The Theory of The Photographic Process*, Fourth Edition, pages 366 to 372, Macmillan Publishing Co. Inc., New York (1977). Yellow dye-releasing redox compounds include azopyrazolone type yellow dye developers and yellow dye-releasing redox compounds having an aryl group at the 1-position of the pyrazolone nucleus, as described, for example, in U.S. Pat. Nos. 3,309,199 and 4,013,633 and U.S. Published Application (USB) No. 351,673. However, the dyes formed from the compounds specifically described in these patents have certain technical problems, including a low transfer speed and a low maximum transferred image density ($D_{max}$). Although improved yellow dye-releasing redox compounds are described in Japanese Patent Application (OPI) No. 111344/79, further improvements have been desired. (The term "OPI" as used herein refers to a "published unexamined Japanese patent application".)

SUMMARY OF THE INVENTION

Therefore, an object of the present invention is to provide a color photographic light-sensitive material containing a compound forming a yellow dye (image) which has a high transfer speed and a high $D_{max}$.

Other objects of the present invention will become apparent from the following detailed description and examples.

The inventors have conducted various investigations and discovered that the above-described object can be effectively attained and that satisfactory photographic characteristics are obtained by using in a color photographic light-sensitive material, an azo dye image-forming compound represented by formula (I)

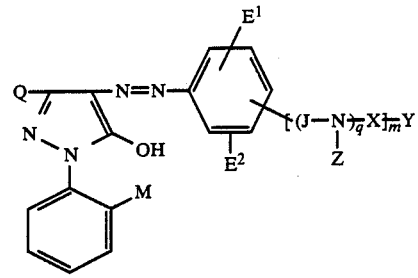

wherein Q represents a cyano group, a trifluoromethyl group, or a carbamoyl group represented by the formula $-CONR^1R^2$ (wherein $R^1$ represents a hydrogen atom, an alkyl group, or a substituted alkyl group, and $R^2$ represents a hydrogen atom, an alkyl group, a substituted alkyl group, an aralkyl group, or an aryl group, or $R^1$ and $R^2$ combine directly or through an oxygen atom to form a ring); M represents an alkyl group, a substituted alkyl group, an alkoxy group, a substituted alkoxy group, or a halogen atom; $E^1$ represents a hydrogen atom, a halogen atom, an alkyl group, a substituted alkyl group, a hydroxyl group, an alkoxy group or a substituted alkoxy group (provided that the substituted alkoxy group is not present at the para-position with respect to the azo group); $E^2$ represents a substituent defined for $E^1$ or an electron attractive group selected from a cyano group, a trifluoromethyl group, a group represented by the formula $-SO_2R^4$ (wherein $R^4$ represents an alkyl group, a substituted alkyl group, a phenyl group, or a substituted phenyl group), a group represented by the formula $-COOR^3$ (wherein $R^3$ represents a hydrogen atom, an alkyl group, a substituted alkyl group, a phenyl group, or a substituted phenyl group), a group represented by the formula $-CONR^1R^2$ (wherein $R^1$ and $R^2$ are each the same as defined above), a sulfo group, and a group represented by the formula $-SO_2NR^1R^2$ (wherein $R^1$ and $R^2$ are each the same as defined above); m and q each represents 0 or 1; J represents a divalent group selected from a sulfonyl group and a carbonyl group; Z represents a hydrogen atom, an alkyl group, or a substituted alkyl group; X represents a divalent bonding group represented by the formula $-A_1-(L)_n-(A_2)_p-$ (wherein $A_1$ and $A_2$ each represents a substituted or unsubstituted alkylene group or a substituted or unsubstituted arylene group, L represents a divalent group selected from an oxy group, a carbonyl group, a carboxyamido group, a carbamoyl group, a sulfonamido group, a sulfamoyl group, a sulfinyl group, and a sulfonyl group, and n and p each represents 0 or 1); and Y represents a moiety which provides, as a result of development processing, an azo dye compound having a different diffusibility from that of the azo dye image-forming compound of formula (I).

DETAILED DESCRIPTION OF THE INVENTION

In addition to the above-described effects, the following effects can also be obtained according to the present invention:
(i) light fastness is good,
(ii) hue of the dye image is excellent, and
(iii) pH dependency of the hue of the dye image is small.

The compounds which can be employed in the present invention are characterized by the presence of the group represented by M in the dye moiety (specifically at the ortho position with respect to the pyrazolone nucleus) in the dyes represented by formula (I). The above-described superior effects of the present invention are based on this group and are completely unexpected in view of compounds as described in U.S. Pat. No. 4,013,633 and Japanese Patent Application (OPI) No. 111344/79.

The alkyl group or the alkyl moiety in the substituted alkyl group represented by M preferably has from 1 to 8 carbon atoms (more preferably from 1 to 4 carbon atoms) and may be straight or branched chain. Examples of suitable substitutents for the substituted alkyl group include a cyano group, an alkoxy group (which may be substituted with a halogen atom, etc.), a hydroxyl group, a carboxyl group, a sulfo group, and the like.

The alkoxy group or the alkyl moiety in the substituted alkoxy group represented by M preferably has from 1 to 8 carbon atoms (more preferably from 1 to 4 carbon atoms). Examples of suitable substituents for the substituted alkoxy group include those as illustrated for the substituted alkyl group described above.

As the halogen atom represented by M, a chlorine atom is particularly preferred.

$R^1$ and $R^2$ in the carbamoyl group represented by the formula $—CONR^1R^2$ for Q have the same meanings as $R^1$ and $R^2$ hereinafter described for $E^2$, respectively.

It is particularly preferred for Q to be a cyano group in view of the excellent light fastness of the transferred dye image.

The alkyl group represented by $E^1$ can be straight or branched chain and preferably is an alkyl group having from 1 to 8 carbon atoms, more preferably an alkyl group having from 1 to 4 carbon atoms (for example, a methyl group, an ethyl group, an n-propyl group, an isopropyl group, an n-butyl group, etc.).

The substituted alkyl group represented by $E^1$ is preferably a substituted alkyl group having from 1 to 8 carbon atoms in the alkyl moiety, and more preferably a substituted alkyl group having from 1 to 4 carbon atoms in the alkyl moiety. Examples of suitable substituents which can be present in the substituted alkyl group include a cyano group, an alkoxy group (which may be substituted with a halogen atom, etc.), a hydroxyl group, a carboxyl group, a sulfo group, and the like.

$R^3$ in the group represented by the formula $—COOR^3$ for $E^2$ preferably represents an alkyl group having from 1 to 8 carbon atoms (more preferably from 1 to 4 carbon atoms), a substituted alkyl group having from 1 to 8 carbon atoms (more preferably from 1 to 4 carbon atoms) in the alkyl moiety, a phenyl group, or a substituted phenyl group having from 6 to 9 carbon atoms.

In the carbamoyl group represented by formula $—CONR^1R^2$ for $E^2$, $R^1$ is preferably a hydrogen atom, an alkyl group having from 1 to 8 carbon atoms (more preferably from 1 to 4 carbon atoms), or a substituted alkyl group having from 1 to 8 carbon atoms (more preferably from 1 to 4 carbon atoms) in the alkyl moiety; and $R^2$ is preferably a hydrogen atom, an alkyl group having from 1 to 8 carbon atoms (more preferably from 1 to 4 carbon atoms), a substituted alkyl group having from 1 to 8 carbon atoms (more preferably from 1 to 4 carbon atoms) in the alkyl moiety, a benzyl group, a phenyl group, or a substituted phenyl group having from 6 to 9 carbon atoms. Also, $R^1$ and $R^2$ may be combined directly or through an oxygen atom to form a 5-membered or 6-membered ring. The cases wherein (1) $R^1$ and $R^2$ each represents a hydrogen atom and (2) one of $R^1$ and $R^2$ represents a hydrogen atom and the other of $R^1$ and $R^2$ represents an alkyl group having from 1 to 4 carbon atoms are particularly preferred, because of the easy availability of the dye compound formed and excellent high transfer speed.

In the sulfonyl group represented by the formula $—SO_2R^4$ for $E^2$, $R^4$ is preferably an alkyl group having from 1 to 8 carbon atoms (more preferably from 1 to 4 carbon atoms), a substituted alkyl group having from 1 to 8 carbon atoms (more preferably from 1 to 4 carbon atoms) in the alkyl moiety, a phenyl group, or a substituted phenyl group having from 6 to 9 carbon atoms.

Examples of suitable substituents which can be present in the above-described substituted alkyl groups represented by $R^1$ to $R^4$ include a cyano group, an alkoxy group (which may be substituted with a halogen atom, etc.), a hydroxyl group, a carboxyl group, a sulfo group, a halogen atom, and the like. Further, examples of suitable substituents which can be present in the above-described substituted phenyl group represented by $R^2$ to $R^4$ include a hydroxyl group, a halogen atom, a carboxyl group, a carbamoyl group, a sulfo group, a sulfamoyl group (which may be substituted with an alkyl group, etc.), and the like.

The alkyl group and the substituted alkyl group represented by Z have the same meanings as those described for M.

In the group represented by the formula $—A_1—(L)_n—(A_2)_p—$ for X, $A_1$ and $A_2$ each preferably represents an alkylene group having from 1 to 6 carbon atoms, a substituted alkylene group having from 1 to 10 carbon atoms (examples of suitable substituents include an alkoxy group having from 1 to 3 carbon atoms, a hydroxyl group, a halogen atom, etc.), an arylene group, a substituted arylene group having from 6 to 10 carbon atoms (examples of suitable substituents include an alkyl group having from 1 to 4 carbon atoms, an alkoxy group having from 1 to 3 carbon atoms, an alkoxyalkoxy group having from 3 to 5 carbon atoms (particularly preferably, a methoxyethoxy group), a hydroxyl group, a halogen atom, a group represented by the formula $—NHSO_2R^5$ (wherein $R^5$ represents a substituted or unsubstituted alkyl group having from 1 to 6 carbon atoms, a phenyl group or a substituted phenyl group having from 6 to 10 carbon atoms or a substituted or unsubstituted aralkyl group having from 7 to 11 carbon atoms), a group represented by the formula $—NHCOR^5$ (wherein $R^5$ has the same meaning as defined above), a group represented by the formula $—SO_2NR^1R^2$ (wherein $R^1$ and $R^2$ each has the same meaning as defined above), a group represented by the formula $—CONR^1R^2$ (wherein $R^1$ and $R^2$ each has the same meaning as defined above), a cyano group, a group represented by the formula $—SO_2R^5$ (wherein $R^5$ has the same meaning as defined above), a group represented by the formula $—COR^5$ (wherein $R^5$ has the same meaning as defined above), a group represented by the formula $—NR^6R^7$ (wherein $R^6$ and $R^7$ each represents a hydrogen atom or a substituted or unsubstituted alkyl group having from 1 to 6 carbon atoms, or $R^6$ and $R^7$ together represent an atomic group forming a 5-memberd or 6-membered heterocyclic group of which morpholino group is particularly preferred), etc.

Of the groups represented by L, $—SO_2NH—$ is particularly preferred.

Compounds represented by formula (I) include negative type non-diffusible image-forming substance (DRR compounds) which provide a diffusible dye as a result of self cleavage due to oxidation induced by the development processing using an alkaline processing solution or heat treatment.

Examples of different type compounds represented by formula (I) include positive type non-diffusible image-forming compounds (DRR compounds) which release a diffusible dye under alkaline condition through self-cyclization or the like, but, when reacted with an oxidation product of a developing agent, do not substantially release the dye.

Specific examples of Y suitable for these types of compounds are described in U.S. Pat. Nos. 3,928,312, 3,993,638, 4,076,529, 4,152,153, 4,055,428, 4,053,312, 4,198,235, 4,179,291, 4,149,892, 3,844,785, 3,443,943, 3,751,406, 3,443,939, 3,443,940, 3,628,952, 3,980,479, 4,183,753, 4,142,891, 4,278,750, 4,139,379, 4,218,368, 3,421,964, 4,199,355, 4,199,354, 4,135,929, 4,336,322, and 4,139,389, Japanese Patent Application (OPI) Nos. 50736/78, 104343/76, 130122/79, 110827/78, 12642/81, 16131/81, 4043/82, 650/82, 20735/82, 69033/78, 130927/79, 164342/81, and 119345/82, etc.

Of the groups represented by Y for the negative type dye-releasing redox compounds, N-substituted sulfamoyl groups are particularly preferred. Suitable N-substituents for the N-substituted sulfamoyl groups include groups derived from aromatic hydrocarbon rings or hetero rings. Representative examples of the groups represented by Y for this type are set forth below, but the present invention is not to be construed as being limited thereto.

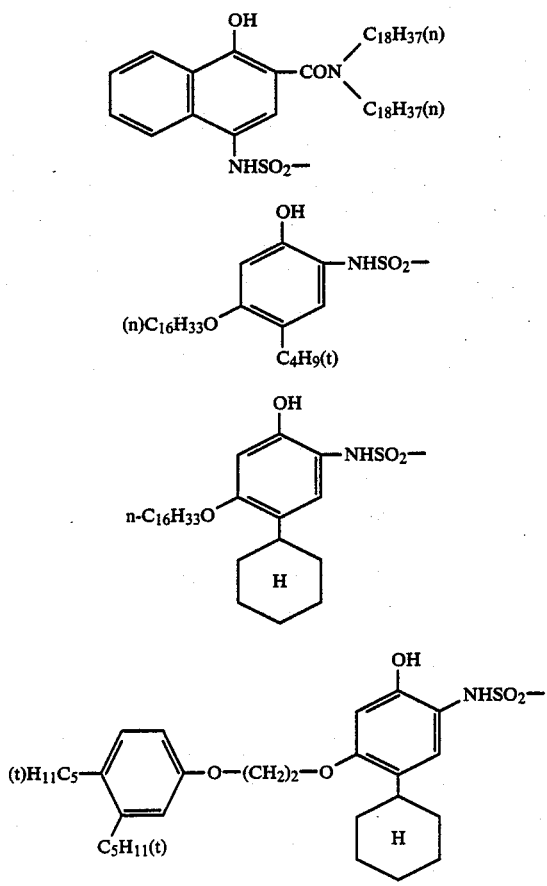

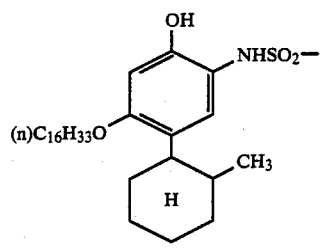

Further, representative examples of the groups represented by Y for the positive type dye-releasing redox compounds are set forth below, but the present invention is not to be construed as being limited thereto.

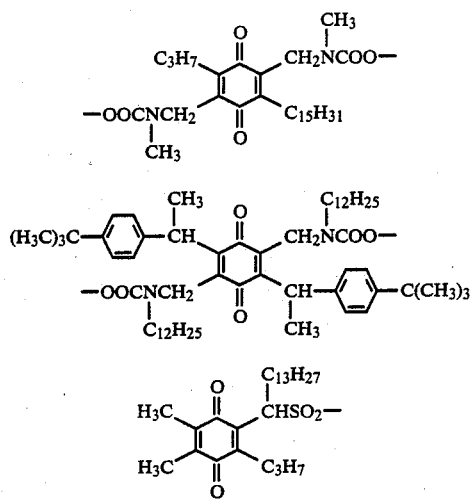

In case of using this positive type of compound, it is preferred that the compounds are employed in combination with non-diffusible electron donative compounds (commonly known as ED compounds) or precursors thereof. Examples of suitable ED compounds are described in U.S. Pat. Nos. 4,263,393 and 4,278,750, Japanese Patent Application (OPI) No. 138736/81, etc.

Examples of another type of compound represented by formula (I) include non-diffusible compounds (dye-releasing couplers) which release a diffusible dye upon coupling reaction with an oxidation product of a color developer oxidized by a silver halide. As examples of Y effective for such compounds, the groups as described in U.S. Pat. No. 3,227,550 are typical.

Still another different type of compound represented by formula (I) includes compounds (referred to as dye developers) which are initially diffusible under alkaline conditions, but, when oxidized through development processing, become non-diffusible. Typical examples of Y groups effective for such compounds are described in U.S. Pat. No. 2,983,606.

Of the azo dye image-forming compounds according to the present invention, DRR compounds are particularly preferred.

More preferred compounds according to the present invention are the compounds represented by formula (I) wherein M represents a lower alkyl group or a lower alkoxy group; Q represents a cyano group; $E^1$ represents a hydrogen atom, a chlorine atom, a lower alkyl group, or a lower alkoxy group; $E^2$ represents a substituent defined for $E^1$, an alkylsulfonyl group having from 1 to 4 carbon atoms, or a sulfamoyl group (which may be substituted with an alkyl group, etc.); and Y has the same meaning as defined in formula (I).

More further preferred compounds are those represented by formula (II) described below.

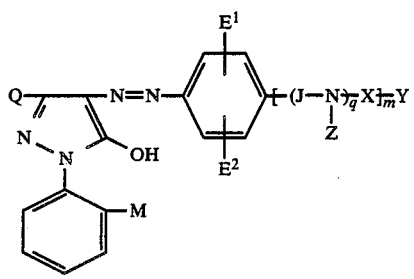

(II)

wherein M, Q, $E^1$, $E^2$, J, Z, X, Y, q, and m each has the same meaning as defined above.

Specific examples of compounds of formula (I) according to the present invention are set forth below, but the present invention is not to be construed as being limited thereto.

Compound 1

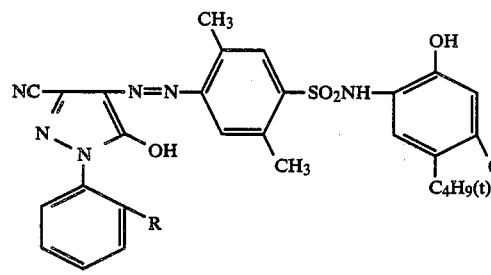

wherein R represents $CH_3$.

Compound 2

Same as Compound 1 except that R represents $OCH_3$.

Compound 3

Same as Compound 1 except that R represents Cl.

Compound 4

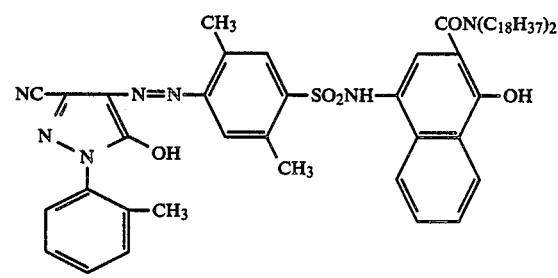

Compound 5

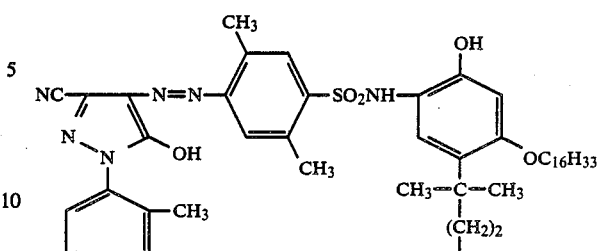

Compound 6

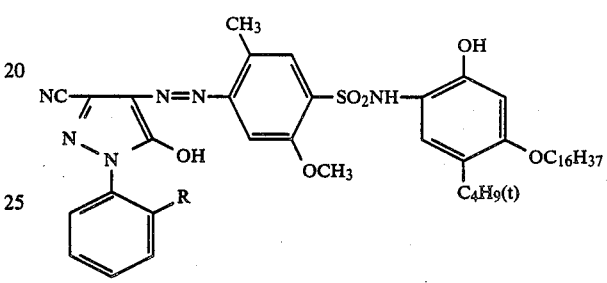

wherein R represents $CH_3$.

Compound 7

Same as Compound 6 except that R represents $OCH_3$.

Compound 8

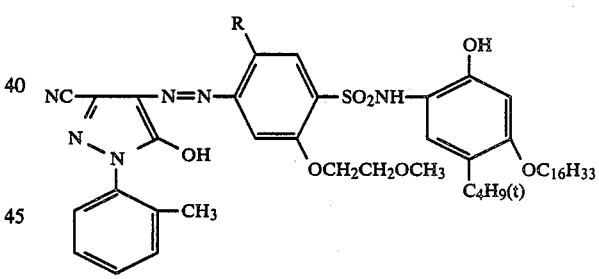

wherein R represents H.

Compound 9

Same as Compound 8 except that R represents $CH_3$.

Compound 10

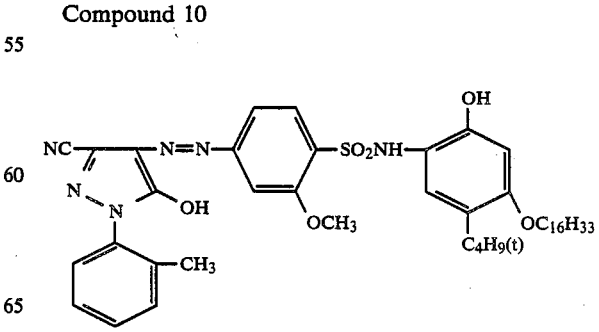

Compound 11

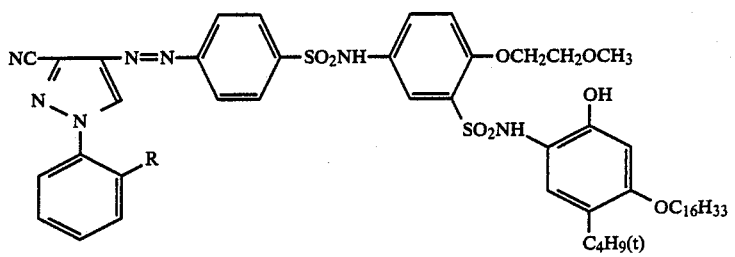
wherein R represents CH₃.
Compound 12
Same as Compound 11 except that R represents OCH₃.
Compound 13
Compound 15
Same as Compound 14 except that R represents CH₃.
Compound 16
Same as Compound 14 except that R represents OCH₃.
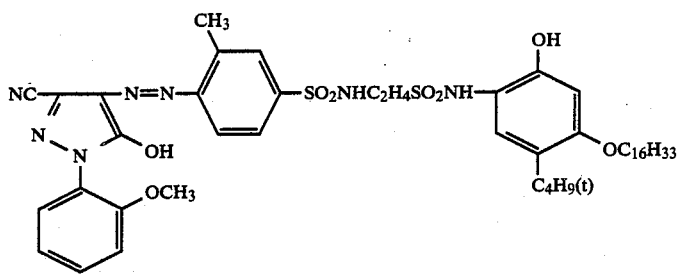
Compound 14
Compound 17
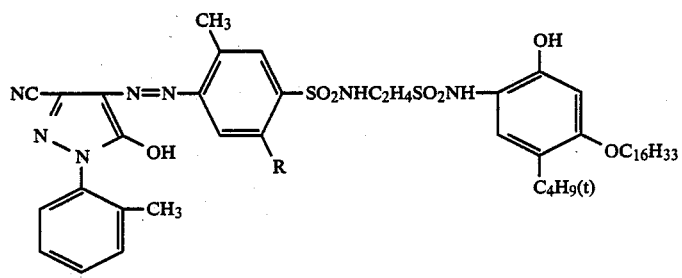
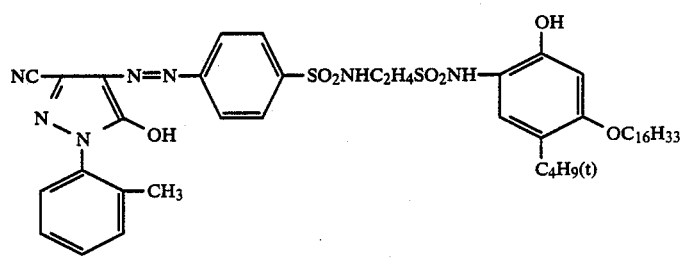
Compound 18
wherein R represents H.

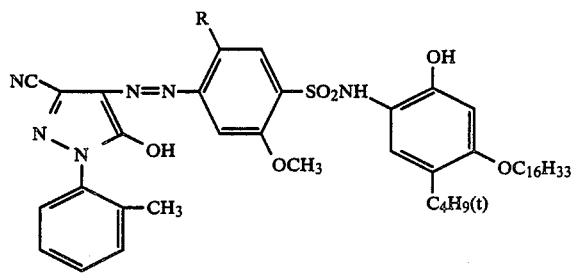

wherein R represents Cl.

Compound 19

Same as Compound 18 except that R represents SO₂CH₃.

Compound 20

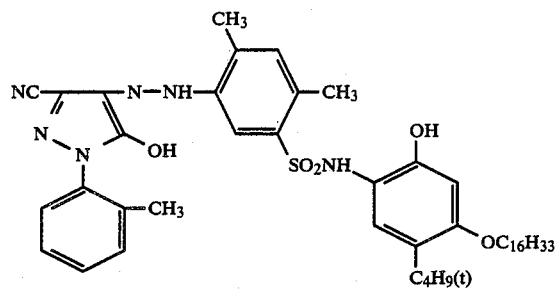

Typical synthesis examples of the abovedescribed DRR compounds used in the present invention and the intermediates thereof are explained in detail below.

SYNTHESIS EXAMPLE 1

Synthesis of Compound 1

(1) Synthesis of 3-cyano-1-(2-methylphenyl)-5-pyrazolone 22.5 g of 3-carbamoyl-1-(2-methylphenyl)-5-pyrazolone and 150 ml of acetonitrile were put into a 300 ml three-necked flask. A mixture solution of 35 ml of phosphorus oxychloride and 100 ml of N,N-dimethylformamide was added dropwise thereto at a temperature of 15° C. or below. After completion of the dropwise addition, the reaction mixture was poured into ice water and the crystals thus deposited were collected by filtration.

Yield: 13.5 g (67.8%)

Melting Point: 175° to 178° C.

(2) Synthesis of 3-cyano-4-(2,5-dimethyl-4-sulfophenylazo)-1-(2-methylphenyl)-5-pyrazolone 5 g of 2,5-dimethylsulfanilic acid, 10 ml of an aqueous solution containing 1 g of sodium hydroxide, and 15 ml of an aqueous solution containing 1.7 g of sodium nitrite were put into a 50 ml three-necked flask and the mixture was completely dissolved. The solution was added dropwise to 40 ml of ice water containing 8 ml of 35% hydrochloric acid while maintaining the temperature at 5° C. or below. After completion of the dropwise addition, the mixture was stirred for 30 minutes.

Separately, 5 g of 3-cyano-1-(2-methylphenyl)-5-pyrazolone synthesized in step (1) above, 30 ml of methyl alcohol and 5 g of sodium acetate were put into a 200 ml three-necked flask. The diazo solution prepared in the above manner was added dropwise to the mixture at a temperature of 10° C. or below. After completion of the dropwise addition, the mixture was stirred for 1 hour and the crystals thus deposited were collected by filtration.

Yield: 8.6 g (79.6%)

Melting Point: 250° C. or higher (3) Synthesis of 4-(4-chlorosulfonyl-2,5-dimethylphenylazo)-3-cyano-1-(2-methylphenyl)-5-pyrazolone 8.6 g of the azo obtained in step (2) above, 35 ml of acetonitrile, and 8.6 ml of N,N-dimethylacetamide were put into a 100 ml three-necked flask and 8.6 ml of phosphorus oxychloride was added dropwise to the mixture at a temperature of 50° C. or below. After completion of the dropwise addition, the mixture was stirred for 30 minutes and then poured into ice water. The crystals thus deposited were collected by filtration.

Yield: 5.2 g (61.0%)

Melting Point: 180° to 182° C.

(4) Synthesis of Compound 1

4.4 g of 2-amino-4-tert-butyl-5-hexadecyloxy-1-phenol, 4.3 g of the pyrazolone dye obtained in step (3) above, 20 ml of N,N-dimethylacetamide and 4.7 ml of pyridine were put into a 100 ml three-necked flask, and the mixture was reacted for 1 hour at room temperature. After completion of the reaction, water and ethyl acetate were added thereto and extracted. The extract was purified with column chromatography.

Yield: 3.7 g (46%)

Melting Point: 133° to 134° C.

Absorbance in acetone (solvent)

$$\epsilon^{acetone}_{446\,nm}: 2.46 \times 10^4$$

SYNTHESIS EXAMPLE 2

Synthesis of Compound 6

(1) Synthesis of 2-methoxy-5-methylsulfanilic acid 23.1 g of 3-methoxy-6-methylaniline and 16.4 g of sulfamic acid were put into a 100 ml egg-plant type flask and the mixture was heated to temperature of from 150° to 160° C. and maintained thereat for 2 hours. Acetonitrile was added to the reaction mixture and the crystals thus deposited were collected. The crystals were dissolved in an aqueous solution of sodium hydroxide, the solution was filtered and acidified with hydrochloric acid, and the crystals thus deposited were collected by filtration.

Yield: 12.5 g (34.1%)

Melting Point: 250° C. or higher (2) Synthesis of 3-cyano-4-(3-methoxy-6-methyl-4-sulfophenylazo)-1-(2-methylphenyl)-5-pyrazolone Using 4.3 g of 2-methoxy-5-methylsulfanilic acid and 4 g of 3-cyano-1-(2-methylphenyl)-5-pyrazolone which is an intermediate of Compound 1, the desired compound was obtained in the same manner as described in step (2) for Compound 1.

Yield: 8.5 g (99.5%)
Melting Point: 250° C. or higher (3) Synthesis of 4-(4-chlorosulfonyl-2-methoxy-5-methylphenylazo)-3-cyano-1-(2-methylphenyl)-5-pyrazolone The desired compound was obtained from 7.8 g of the azo dye obtained in step (2) above in the manner as described in step (3) for Compound 1.

Yield: 4.7 g (78.1%)
Melting Point: 203° to 205° C.

(4) Synthesis of Compound 6

Using 2.7 g of 2-amino-4-tert-butyl-5-hexadecyloxy-1-phenol and 2.7 g of the azo dye obtained in step (3) above, the desired compound was synthesized in the same manner as described in step (4) for Compound 1.

Yield: 1.8 g (36.9%)
Melting Point: 196° to 198° C.
Absorbance in Acetone (solvent)

$$\epsilon_{454\ nm}^{acetone}: 2.47 \times 10^4$$

Other compounds according to the present invention can be synthesized in a manner similar to those described above.

The color photographic light-sensitive material of the present invention can also be employed in a heat development process. Layer construction of light-sensitive materials and other additives suitable for the heat development process are described, for example, in European Patent Application (OPI) No. 76,492 A2, etc.

In cases of applying the color photographic light-sensitive material of the present invention to a color diffusion transfer photographic process, the photographic light-sensitive material can be constructed in the form of a peel-apart type film unit, an integrated type film unit as described in Japanese Patent Publication Nos. 16356/71 and 33697/73, Japanese Patent Application (OPI) No. 13040/75, and British Pat. No. 1,330,524, etc., or a peel-apart unnecessary type film unit as described in Japanese Patent Application (OPI) No. 119345/82. Further it may be an integrated type film unit capable of being peeled off if desired (as described in Japanese Patent Application (OPI) Nos. 67840/81 and 220727/84, etc.).

In any of the above described types of format, it is advantageous to utilize a melt adhesion latex polymer layer, as described in Japanese Patent Application (OPI) Nos. 145217/77, 72622/78, 78130/79, 138432/79, and 138433/79, etc., or a polymer acid layer protected with a temporary barrier layer which acts so as to make the neutralization-timing time short at a high processing temperature and which is composed of a polymer containing a lactone ring as described in Japanese Patent Application (OPI) No. 54341/80 and Research Disclosure, RD No. 18452 (August, 1979), etc., in order to broaden the useful range of the processing temperature.

The light-sensitive silver halide emulsion used in the present invention is a dispersion of silver chloride, silver bromide, silver chlorobromide, silver iodobromide, silver chloroiodobromide, or a mixture thereof in a hydrophilic colloid. The halogen composition of the silver halide is selected depending on the purpose for which the light-sensitive material is used and the processing conditions of the light-sensitive material. However, it is particularly preferred to use a silver bromide emulsion, a silver iodobromide emulsion, or a silver chloroiodobromide emulsion wherein the iodide content is 10 mol% or less and the chloride content is 30 mol% or less.

In the present invention, it is possible to use not only a surface latent image type negative emulsion but also a direct reversal type emulsion. Examples of the latter type emulsion include an internal latent image type emulsion and a fogged direct reversal type emulsion.

The internal latent image type silver halide emulsion advantageously used in the present invention include a conversion type silver halide emulsion, a core/shell type silver halide emulsion, a silver halide emulsion containing a different kind of metal, and the like, as described in U.S. Pat. Nos. 2,592,250, 3,206,313, 3,447,927, 3,761,276, and 3,935,014, etc.

A nucleating agent is applied to this type of silver halide emulsion. Typical nucleating agents include hydrazines as described in U.S. Pat. Nos. 2,588,982 and 2,563,785; hydrazides and hydrazones as described in U.S. Pat. No. 3,227,552; quaternary salt compounds as described in British Pat. No. 1,283,835, Japanese Patent Publication No. 38164/74, U.S. Pat. Nos. 4,115,122, 3,734,738, 3,719,494, and 3,615,615; sensitizing dyes having a nucleating substituent in the dye molecule as described in U.S. Pat. No. 3,718,471; and thiourea-connected type acylhydrazine compounds as described in U.S. Pat. Nos. 4,030,925, 4,031,127, 4,245,037, 4,255,511, 4,266,013, and 4,276,364, etc.

The silver halide emulsion used in the present invention can be modified to have an enlarged spectral sensitivity by the action of a spectral sensitizing dye, if desired. Useful spectral sensitizing dyes include cyanine dyes and merocyanine dyes.

Dyes formed from magenta and cyan dye-providing compounds which can be used in combination with the yellow dye image-forming compound according to the present invention are either completed dyes or dye precursors which can be converted to dyes during the photographic processing steps or upon an additional processing step. Dyes of final images may be metal chelated or not. Typical magenta and cyan dyes suitable for use in the present invention include azo dyes, azomethine dyes, anthraquinone dyes, phthalocyanine dyes, triphenylmethane dyes, indigoid dyes, each of which is metal chelated or not. Any of known dye-providing compounds can be employed in the present invention.

Further, as one kind of dye precursors, dye-providing compounds having a dye portion in which a light absorption range is temporarily shifted in the light-sensitive element can be used in the present invention. Specific examples of such dye-providing compounds are described in Japanese Patent Application (OPI) Nos. 53330/80 and 53329/80, U.S. Pat. Nos. 3,336,287, 3,579,334, and 3,982,946, and British Pat. No. 1,467,317, etc.

The coating amount of the dye-providing compound is from $1 \times 10^{-4}$ to $1 \times 10^{-2}$ mol/m$^2$, preferably from $2 \times 10^{-4}$ to $2 \times 10^{-3}$ mol/m$^2$.

The dye-providing compound used in the present invention can be dispersed in a hydrophilic colloid by various methods depending on the particular type of the compound. For example, a compound having a dissociative group such as a sulfo group or a carboxyl group can be dispersed in a hydrophilic colloid solution after dissolving in water or an alkaline aqueous solution. On the other hand, a compound, which is sparingly soluble in an aqueous medium but easily soluble in an organic solvent, can be dispersed in the following manner:

(1) The compound is dissolved in a substantially water-insoluble high-boiling solvent and then the solution formed is dispersed in a hydrophilic colloid solution. Such a method is described, for example, in U.S. Pat. Nos. 2,322,027, 2,533,514, and 2,801,171. Also, a low-boiling solvent or an organic solvent readily soluble in water may be used in the aforesaid method and such a solvent is removed by volatilization under drying or by washing with water.

(2) The compound is dissolved in a water-miscible solvent. The solution is then dispersed in a hydrophilic colloid solution.

(3) In method (1) described above, an oleophilic polymer may be used instead of or in combination with the high-boiling solvent. Such a method is described, for example, in U.S. Pat. No. 3,619,195 and West German Pat. No. 1,957,467.

(4) The compound is dissolved in a water-miscible solvent and an aqueous latex is gradually added thereto to provide a dispersion wherein the compound is incorporated in the latex particles. This method is described, for example, in Japanese Patent Application (OPI) No. 59943/76, etc.

Moreover, a hydrosol of an oleophilic polymer described, for example, in Japanese Patent Publication No. 39835/76 may be added to the hydrophilic colloid dispersion obtained by the above-described method.

Dispersion of the dye-providing compound is greatly promoted by using a surface active agent as an emulsifying aid. Examples of the useful surface active agents are described, for example, in the above-mentioned patent specifications and Japanese Patent Publication No. 4923/64 and U.S. Pat. No. 3,676,141, etc.

Examples of the hydrophilic colloids useful for dispersing the dye-providing compounds include, for example, gelatin, colloidal albumin, casein, a cellulose derivative such as carboxymethyl cellulose, hydroxyethyl cellulose, etc., a saccharide derivative such as agaragar, sodium alginate, a starch derivative, etc., and a synthetic hydrophilic colloid such as polyvinyl alcohol, poly-N-vinyl pyrrolidone, polyacrylic acid copolymer, polyacrylamide, and a derivative thereof (for example, a partially hydrolyzed product). These colloids may be used in various combinations of two or more as a miscible mixture. Among the aforesaid materials, gelatin is most commonly used and gelatin may be partially or wholly replaced with a synthetic hydrophilic colloid.

The process for obtaining color diffusion transfer images using dye-providing compounds is described in *Photographic Science and Engineering*, Vol. 20, No. 4, pages 155 to 164 (July/August, 1976).

In the above-described process any silver halide developing agent which can cross-oxidize the dye providing compound can be used. Such a developing agent may be incorporated in an alkaline processing composition or in an appropriate layer of a photographic element. Examples of the developing agents used in the present invention include hydroquinones, aminophenols, phenylenediamines, pyrazolidinones (for example, 1-phenyl-3-pyrazolidinone, 1-phenyl-4,4-dimethyl-3-pyrazolidinone, 1-p-tolyl-4-methyl-4-hydoxymethyl-3-pyrazolidinone, 1-(4'-methoxy-phenyl)-4-methyl-4-hydroxymethyl-3-pyrazolidinone, and 1-phenyl-4-methyl-4-hydroxymethyl-3-pyrazolidinone), and the like, as described in Japanese Patent Application (OPI) No. 16131/81.

Of these developing agents, generally black-and-white developing agents (in particular, pyrazolidinones) which are capable of reducing the formation of stains in an image-receiving layer are particularly preferred in comparison with color developing agents such as phenylenediamines.

The processing composition used in the present invention contains a base such as sodium hydroxide, potassium hydroxide, sodium carbonate, or sodium phosphate, and has a pH of about 9 or higher, preferably 11.5 or higher. The processing composition may contain an antioxidant such as sodium sulfite, an ascorbic acid salt, or a piperidinohexose reductone and may contain a silver ion concentration controlling agent such as potassium bromide. The processing composition may further contain a viscosity increasing compound such as hydroxyethyl cellulose or sodium carboxymethyl cellulose.

The alkaline processing composition used in the present invention may also contain a development accelerating compound or a compound for accelerating the diffusion of dyes (for example, benzyl alcohol, etc.).

For the reproduction of natural color by a subtractive color process, the light-sensitive material has a combination of at least a silver halide emulsion having a selective spectral sensitivity in a certain wavelength region and a dye-providing compound having a selective spectral absorption in the same wavelength region.

In particular, a light-sensitive material comprising a combination of a blue-sensitive silver halide emulsion and a yellow dye-providing compound, a combination of a green-sensitive silver halide emulsion and a magenta dye-providing compound, and a combination of a red-sensitive silver halide emulsion and a cyan dye providing compound is useful. These combination units of the silver halide emulsions and the dye-providing compounds may be coated as a laminated layer in a face-to-face relationship in the light-sensitive material or may be coated as one layer of a mixture of the particles (a dye-providing compound and a silver halide grain existing in the same particle).

Between an interlayer and a layer containing the dye-providing compound, a spacing layer as described in Japanese Patent Application (OPI) No. 52056/80 may be provided. Further, a silver halide emulsion as described in Japanese Patent Application (OPI) No. 67850/81 may be added to an interlayer.

A mordanting layer, a neutralizing layer, a neutralization speed-controlling layer (timing layer), and a processing composition used for the photographic light-sensitive material for color diffusion transfer process according to the present invention are described, for example, in Japanese Patent Application (OPI) No. 149328/78.

Polymer mordants which can be used in the present invention include polymers containing secondary and tertiary amino groups, polymers having nitrogen-containing heterocyclic moieties, polymers containing quaternary cationic groups thereof, having a molecular weight of 5,000 or more, and particularly preferably of 10,000 or more.

Examples include vinylpyridine polymers and vinylpyridinium cation polymers as disclosed in U.S. Pat. Nos. 2,548,564, 2,484,430, 3,148,061, and 3,756,814, etc., vinylimidazolium cation polymer as disclosed in U.S. Pat. No. 4,124,386, etc., polymer mordants capable of cross-linking with gelatin as disclosed in U.S. Pat. Nos. 3,625,694, 3,859,096, and 4,128,538, British Pat. No. 1,277,453, etc., aqueous sol type mordants as disclosed in U.S. Pat. Nos. 3,958,995, 2,721,852, and 2,798,063, Japanese Patent Application (OPI) Nos. 115228/79, 145529/79, 126027/79, 155835/79, and 17352/81, etc., water-insoluble mordants as disclosed in U.S. Pat. No. 3,898,088, etc., reactive mordants capable of forming covalent bonds with dyes used as disclosed in U.S. Pat. Nos. 4,168,976 and 4,201,840, etc., and mordants disclosed in U.S. Pat. Nos. 3,709,690, 3,788,855, 3,642,482, 3,488,706, 3,557,066, 3,271,147, and 3,271,148, Japanese Patent Application (OPI) Nos. 30328/78, 155528/77, 125/78, 1024/78, and 107835/78, British Pat. No. 2,064,802, etc.

In addition, the mordants as described in U.S. Pat. Nos. 2,675,316 and 2,882,156 can be employed.

The color photographic light-sensitive material of the present invention can be constructed to form a light-sensitive sheet without the image-receiving layer, wherein soluble dye compounds are dissolved out upon tank development and remaining insoluble (non-diffusible) dye compounds are utilized as color images, in addition to the above-described formats. Therefore, the present invention can be applied to any material provided that diffusion of dyes is used.

The present invention is explained in more detail with reference to the following example, but the present invention is not to be construed as being limited thereto.

EXAMPLE

A light-sensitive sheet, a cover sheet and a processing solution each of which was employed for a color diffusion transfer photographic light-sensitive material were prepared in the following manner.

Light-Sensitive Sheet:

On a transparent polyethylene terephthalate film support, were coated layers described below in the order listed to prepare Light-Sensitive Sheets 1 to 5.

(1) Image-receiving layer containing 3.0 g/m$^2$ of copoly(styrene-N-vinylbenzyl-N,N,N-trihexylammonium chloride) and 3.0 g/m$^2$ of gelatin.

(2) White reflective layer containing 20 g/m$^2$ of titanium dioxide and 2.0 g/m$^2$ of gelatin.

(3) Light-shielding layer containing 2.0 g/m$^2$ of carbon black and 1.5 g/m$^2$ of gelatin.

(4) Layer containing 0.44 g/m$^2$ of a cyan dye-releasing redox compound of the structural formula shown below, 0.09 g/m$^2$ of tricyclohexyl phosphate, 0.008 g/m$^2$ of 2,5-di-tert-pentadecylhydroquinone, and 0.8 g/m$^2$ of gelatin.

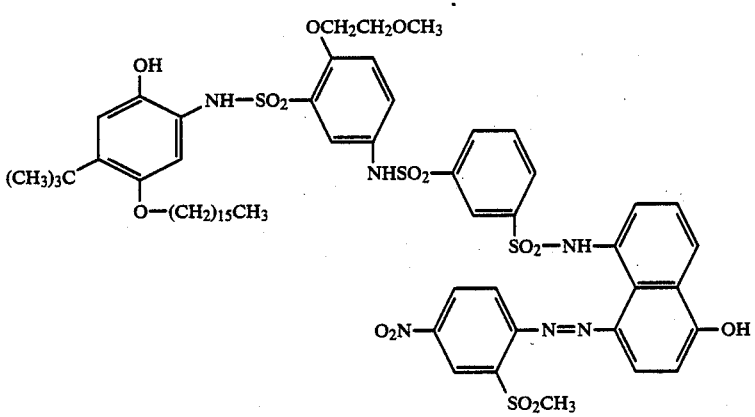

(5) Red-sensitive emulsion layer containing a red-sensitive internal latent image type direct positive silver bromide emulsion (1.03 g/m$^2$ calculated as silver), 1.2 g/m$^2$ of gelatin, 0.04 mg/m$^2$ of a nucleating agent of the structural formula shown below, and 0.13 g/m$^2$ of 2-sulfo-5-n-pentadecylhydroquinone sodium salt.

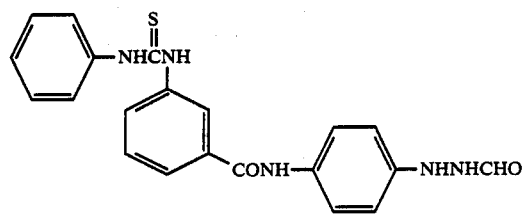

(6) Layer containing 0.43 g/m$^2$ of 2,5-di-tert-pentadecylhydroquinone, 0.1 g/m$^2$ of trihexyl phosphate, and 0.4 g/m$^2$ of gelatin.

(7) Layer containing 0.21 g/m$^2$ of a magenta dye releasing redox compound of the structural formula I shown below, 0.11 g/m$^2$ of a magenta dye releasing redox compound of the structural formula II shown below, and 0.08 g/m$^2$ of tricyclohexyl phosphate, 0.009 g/m$^2$ of 2,5-di-tert-pentadecylhydroquinone, and 0.9 g/m$^2$ of gelatin.

Formula I

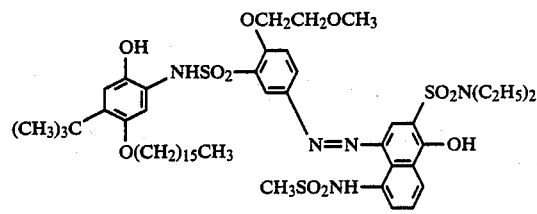

Formula II

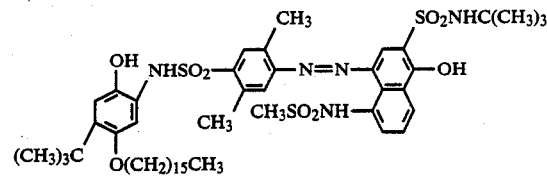

(8) Green-sensitive emulsion layer containing a green-sensitive internal latent image type direct positive silver bromide emulsion (0.82 g/m$^2$ calculated as silver), 0.9 g/m$^2$ of gelatin, 0.03 mg/m$^2$ of the same nucleating agent as incorporated in the layer (5), and 0.08 g/m² of 2-sulfo-5-n-pentadecylhydroquinone sodium salt.

(9) The same layer as the layer (6).

(10) Layer containing 0.53 g/m² of an yellow dye-releasing redox compound as shown in Table 1 below, 0.13 g/m² of tricyclohexyl phosphate, 0.014 g/m² of 2,5-di-tert-pentadecylhydroquinone, and 0.7 g/m² of gelatin.

(11) Blue-sensitive emulsion layer containing a blue-sensitive internal latent image type direct positive silver bromide emulsion (1.09 g/m² calculated as silver), 1.1 g/m² of gelatin, 0.04 mg/m² of the same nucleating agent as incorporated in the layer (5), and 0.07 g/m² of 2-sulfo-5-n-pentadecylhydroquinone sodium salt.

(12) Protective layer containing 0.5 g/m² of gelatin, 0.06 g/m² of a polymethyl methacrylate latex, and 0.02 g/m² of triacryloyltriazine as a hardening agent.

Cover Sheet:

On a transparent polyethylene terephthalate film support, were coated layers (1') to (3') described below in this order to prepare a cover sheet.

(1') Layer containing 22 g/m² of an acrylic acid-butyl acrylate (80/20 by weight) copolymer and 0.44 g/m² of 1,4-bis(2,3-epoxypropoxy)butane.

(2') Layer containing 3.8 g/m² of acetyl cellulose (which produced 39.4 g of an acetyl group when hydrolyzed in an amount of 100 g), 0.23 g/m² of a ring cleavage product obtained by making methanol act upon a styrenemaleic anhydride copolymer (copolymerization ratio: 60/40 by weight, molecular weight: about 50,000), and 0.154 g/m² of 5-(2-cyano-1-methylethylthio)-1-phenyltetrazole.

(3') Layer having a thickness of 2 μm which was formed by coating a latex mixture prepared by mixing a styrene-n-butyl acrylate-acrylic acid-N-metylolacrylamide (49.7/42.3/3/5 by weight) copolymer latex with a methyl methacrylate-acrylic acid-N-methylolacrylamide (93/4/3 by weight) copolymer latex in a ratio of 6 (the former) to 4 (the latter) based on the amount of solid.

Processing Solution:

| | |
|---|---|
| 1-p-Tolyl-4-hydroxymethyl-4-methyl-3-pyrazolidone | 6.9 g |
| Methylhydroquinone | 0.3 g |
| 5-Methylbenzotriazole | 3.5 g |
| Sodium Sulfite (Anhydrous) | 0.2 g |
| Sodium Salt of Carboxymethyl Cellulose | 58 g |
| Potassium Hydroxide (28% Aqueous Solution) | 200 cc |
| Benzyl Alcohol | 1.5 g |
| Carbon Black | 150 g |
| Water | 685 cc |

Light-Sensitive Sheets 1 to 5 were exposed to light through a continuous wedge and the cover sheet was superposed thereon. Then, the processing solution was spread between the light-sensitive sheet and the cover sheet by passing them through a pair of press rollers. Then densities of $D_{max}$ area were measured for 60 minutes at intervals of 10 seconds, and change in the density as a function of time was plotted. From the diagram thus formed, the time required to reach 50% of the density obtained after 60 minutes (T 50%) was determined, and such times were compared with each other to evaluate a transfer speed (see Table 1 below).

Further, $D_{max}$ and $D_{min}$ were obtained by measuring the optical density of each 2 hours after the spreading. The results are shown in Table 1.

TABLE 1

| Light-Sensitive Sheet | Yellow Dye Releasing Compound | Transfer* Speed (sec) | B D max | B D min | Remarks |
|---|---|---|---|---|---|
| 1 | Comparison Compound A | 98 | 1.63 | 0.20 | Comparison |
| 2 | Comparison Compound B | 108 | 1.59 | 0.20 | Comparison |
| 3 | Comparison Compound C | 108 | 1.60 | 0.20 | Comparison |
| 4 | Compound 1 | 90 | 1.73 | 0.20 | Present Invention |
| 5 | Compound 1 | 89 | 1.75 | 0.20 | Present Invention |

*T 50%: The smaller value means higher transfer speed.

Comparison Compounds

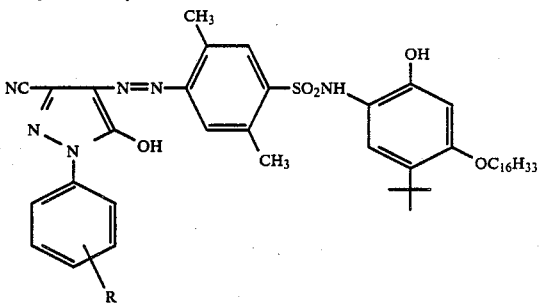

Comparison Compounds R
A: R = H
B: R = m-CH₃
C: R = p-CH₃

From the results shown in Table 1, it is apparent that the photographic light-sensitive materials according to the present invention provide an extremely high transfer speed and high $D_{max}$.

In particular, it is clear that when a methyl group or a methoxy group is present at the ortho position of the phenyl group of the 1-phenyl-5-pyrazolone nucleus, a very high transfer speed is achieved in comparison with the cases wherein such a group is present at the meta-position or para-position, and the transfer speed is higher than that obtained from the unsubstituted corresponding compound. The fact that the ortho-substituted compound has an exceptionally high transfer speed is unexpected and surprising. It is also surprising that the $D_{max}$ values obtained from the ortho-substituted compounds according to the present invention are extraordinarily high.

While the invention has been described in detail and with reference to specific embodiments thereof, it will be apparent to one skilled in the art that various changes and modifications can be made therein without departing from the spirit and scope thereof.

What is claimed is:

1. A color photographic light-sensitive material comprising a support having thereon at least one light-sensitive silver halide emulsion layer having associated therewith a compound represented by formula (I)

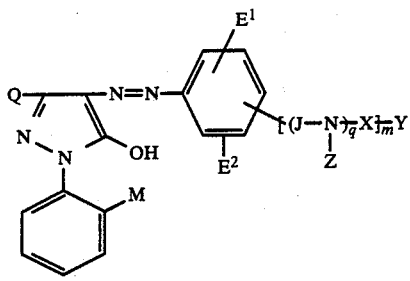

(I)

wherein Q represents a cyano group; M represents an alkyl group, a substituted alkyl group, an alkoxy group, a substituted alkoxy group, or a halogen atom; $E^1$ represents a hydrogen atom, a halogen atom, an alkyl group, a substituted alkyl group, a hydroxyl group, an alkoxy group, or a substituted alkoxy group, provided that the substituted alkoxy group is not present at the para-position with respect to the azo group; $E^2$ represents a substituent defined for $E^1$ or an electron attractive group selected from a cyano group, a trifluoromethyl group, a group represented by the formula $-SO_2R^4$, wherein $R^4$ represents an alkyl group, a substituted alkyl group, a phenyl group, or a substituted phenyl group, a group represented by the formula $-COOR^3$, wherein $R^3$ represents a hydrogen atom, an alkyl group, a substituted alkyl group, a phenyl group, or a substituted phenyl group, a group represented by the formula $-CONR^1R^2$, wherein $R^1$ and $R^2$ are each the same as defined above, a sulfo group, and a group represented by the formula $-SO_2NR^1R^2$, wherein $R^1$ and $R^2$ are each the same as defined above; m and q each represents 0 or 1; J represents a divalent group selected from a sulfonyl group and a carbonyl group; Z represents a hydrogen atom, an alkyl group, or a substituted alkyl group; X represents a divalent bonding group represented by the formula $-A_1-(L)_n-(A_2)_p-$, wherein $A_1$ and $A_2$ each represents a substituted or unsubstituted alkylene group or a substituted or unsubstituted arylene group, L represents a divalent group selected from an oxy group, a carbonyl group, a carboxyamido group, a carbamoyl group, a sulfonamido group, a sulfamoyl group, a sulfinyl group, and a sulfonyl group, and n and p each represents 0 or 1; and Y represents a moiety which provides, as a result of development processing, an azo dye compound having a different diffusibility from that of the azo dye image-forming compound of formula (I).

2. A color photographic light-sensitive material as in claim 1, wherein each of the alkyl group and the substituted alkyl group represented by M, $E^1$, $E^2$, and Z has from 1 to 8 carbon atoms.

3. A color photographic light-sensitive material as in claim 2, wherein each of the alkyl group or the substituted alkyl group has from 1 to 4 carbon atoms.

4. A color photographic light-sensitive material as in claim 1, wherein the substituted alkyl group represented by M, $E^1$, $E^2$, and Z contains as a substituent a cyano group, an alkoxy group, a hydroxyl group, a carboxyl group, or a sulfo group.

5. A color photographic light-sensitive material as in claim 1, wherein each the alkoxy group and the substituted alkoxy group represented by M has from 1 to 8 carbon atoms.

6. A color photographic light-sensitive material as in claim 5, wherein the alkoxy group and the substituted alkoxy group has from 1 to 4 carbon atoms.

7. A color photographic light-sensitive material as in claim 1, wherein the substituted alkoxy group represented by M, $E^1$, and $E^2$ contains as a substituent a cyano group, an alkoxy group, a hydroxyl group, a carboxyl group, or a sulfo group.

8. A color photographic light-sensitive material as in claim 1, wherein the halogen atom represented by M is a chlorine atom.

9. A color photographic light-sensitive material as in claim 1, wherein $R^3$ in the group represented by the formula $-COOR^3$ for $E^2$ represents an alkyl group having from 1 to 8 carbon atoms, a substituted alkyl group having from 1 to 8 carbon atoms, a phenyl group, or a substituted phenyl group having from 6 to 9 carbon atoms.

10. A color photographic light-sensitive material as in claim 1, wherein $R^1$ in the carbamoyl group represented by the formula $-CONR^1R^2$ or the sulfamoyl group represented by the formula $-SO_2NR^1R^2$ for $E^2$ is a hydrogen atom, an alkyl group having from 1 to 8 carbon atoms, or a substituted alkyl group having from 1 to 8 carbon atoms.

11. A color photographic light-sensitive material as in claim 1, wherein $R^2$ in the carbamoyl group represented by the formula $-CONR^1R^2$ or the sulfamoyl group represented by the formula $-SO_2NR^1R^2$ for $E^2$ is a hydrogen atom, an alkyl group having from 1 to 8 carbon atoms, a substituted alkyl group having from 1 to 8 carbon atoms, a benzyl group, a phenyl group, or a substituted phenyl group having from 6 to 9 carbon atoms.

12. A color photographic light-sensitive material as in claim 1, wherein $R^1$ and $R^2$ in the carbamoyl group represented by the formula $-CONR^1R^2$ for $E^2$ each represents a hydrogen atom.

13. A color photographic light-sensitive material as in claim 1, wherein, in the carbamoyl group represented by the formula $-CONR^1R^2$ for $E^2$, one of $R^1$ and $R^2$ represents a hydrogen atom and the other of $R^1$ and $R^2$ represents an alkyl group having from 1 to 4 carbon atoms.

14. A color photographic light-sensitive material as in claim 1, wherein $R^4$ in the sulfonyl group represented by the formula $-SO_2R^4$ for $E^2$ is an alkyl group having from 1 to 8 carbon atoms, a substituted alkyl group having from 1 to 8 carbon atoms, a phenyl group, or a substituted phenyl group having from 6 to 9 carbon atoms.

15. A color photographic light-sensitive material as in claim 1, wherein the substituted alkyl group represented by $R^1$, $R^2$, $R^3$, and $R^4$ contains as a substituent a cyano group, an alkoxy group, a hydroxyl group, a carboxyl group, a sulfo group, or a halogen atom.

16. A color photographic light-sensitive material as in claim 1, wherein the substituted phenyl group represented by $R^2$, $R^3$, and $R^4$ contains as a substituent a hydroxyl group, a halogen atom, a carboxyl group, a carbamoyl group, a sulfo group, or a sulfamoyl group.

17. A color photographic light-sensitive material as in claim 1, wherein $A_1$ and $A_2$ in the group represented by the formula $-A_1-(L)_n-(A_2)_p-$ for X each represents an alkylene group having from 1 to 6 carbon atoms, a substituted alkylene group having from 1 to 10 carbon atoms, an arylene group, or a substituted arylene group having from 6 to 10 carbon atoms.

18. A color photographic light-sensitive material as in claim 17, wherein a substituent for the substituted alkylene group represented by $A_1$ and $A_2$ is an alkoxy group having from 1 to 3 carbon atoms, a hydroxyl group, or a halogen atom.

19. A color photographic light-sensitive material as in claim 17, wherein the substituted arylene group represented by $A_1$ and $A_2$ contains as a substituent an alkyl group having from 1 to 4 carbon atoms, an alkoxy group having from 1 to 3 carbon atoms, an alkoxyalkoxy group having from 3 to 5 carbon atoms, a hydroxyl group, a halogen atom, a group represented by the formula —NHSO$_2$R$^5$, wherein R$^5$ represents a substituted or unsubstituted alkyl group having from 1 to 6 carbon atoms, a phenyl group, a substituted phenyl group having from 6 to 10 carbon atoms, or a substituted or unsubstituted aralkyl group having from 7 to 11 carbon atoms, a group represented by the formula —NHCOR$^5$, wherein R$^5$ has the same meaning as defined above, a group represented by the formula —SO$_2$NR$^1$R$^2$, wherein R$^1$ represents a hydrogen atom, an alkyl group having from 1 to 8 carbon atoms, or a substituted alkyl group having from 1 to 8 carbon atoms in the alkyl moiety, and R$^2$ represents a hydrogen atom, an alkyl group having from 1 to 8 carbon atoms, a substituted alkyl group having from 1 to 8 carbon atoms in the alkyl moiety, a benzyl group, a phenyl group, or a substituted phenyl group having from 6 to 9 carbon atoms, a group represented by the formula —CONR$^1$R$^2$, wherein R$^1$ and R$^2$ each has the same meaning as defined above, a cyano group, a group represented by the formula —SO$_2$R$^5$, wherein R$^5$ has the same meaning as defined above, a group represented by the formula —COR$^5$, wherein R$^5$ has the same meaning as defined above, a group represented by the formula —NR$^6$R$^7$, wherein R$^6$ and R$^7$ each represents a hydrogen atom or a substituted or unsubstituted alkyl group having from 1 to 6 carbon atoms, or R$^6$ and R$^7$ together represent an atomic group forming a 5-membered or 6-membered heterocyclic group.

20. A color photographic light-sensitive material as in claim 1, wherein L represents —SO$_2$NH—.

21. A color photographic light-sensitive material as in claim 1, wherein the compound represented by formula (I) is a dye-releasing redox compound.

22. A color photographic light-sensitive material as in claim 1, wherein the compound represented by formula (I) is a dye-releasing coupler.

23. A color photographic light-sensitive material as in claim 1, wherein Y is an N-aromatic hydrocarbon ring-substituted sulfamoyl group.

24. A color photographic light-sensitive material as in claim 1, wherein Y is an N-hetero ring-substituted sulfamoyl group.

25. A color photographic light-sensitive material as in claim 1, wherein M represents a lower alkyl group or a lower alkoxy group; E$^1$ represents a hydrogen atom, a chlorine atom, a lower alkyl group, or a lower alkoxy group; E$^2$ represents a substituent defined for E$^1$, an alkylsulfonyl group having from 1 to 4 carbon atoms, or a sulfamoyl group.

26. A color photographic light-sensitive material as in claim 1, wherein the compound represented by formula (I) is a compound represented by formula (II)

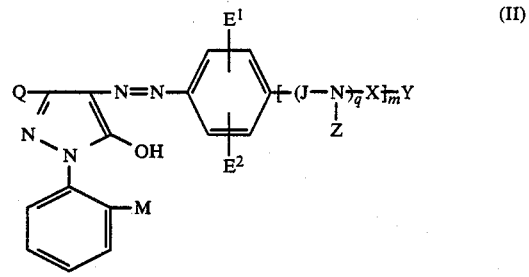

wherein M, Q, E$^1$, J, Z, X, Y, q, and m each has the same meaning as defined in formula (I).

27. A color photographic light-sensitive material as in claim 1, wherein a silver halide emulsion in the light-sensitive emulsion layer is an internal latent image type direct reversal emulsion.

28. A color photographic light-sensitive material as in claim 1, wherein a silver halide emulsion in the light-sensitive emulsion layer is a blue-sensitive silver halide emulsion.

29. A color photographic light-sensitive material as in claim 28, wherein the photographic light-sensitive material further contains a combination of a green-sensitive silver halide emulsion and a magenta dye-providing compound and a combination of a red-sensitive silver halide emulsion and a cyan dye-providing compound.

* * * * *